US006078895A

United States Patent [19]

Ryu et al.

[11] Patent Number: 6,078,895

[45] Date of Patent: Jun. 20, 2000

[54] TECHNIQUE FOR SHOWING RUNNING TIME BY SECTIONS ON TOLLWAY

[75] Inventors: Duk-Kyun Ryu, Kawachun; Seog-Min Choi, Seoul, both of Rep. of Korea

[73] Assignee: SamSung Electronics Co., Ltd., Suwon, Rep. of Korea

[21] Appl. No.: 09/137,165

[22] Filed: Aug. 20, 1998

[30] Foreign Application Priority Data

Aug. 20, 1997 [KR] Rep. of Korea ...................... 97-39746

[51] Int. Cl.[7] ............................ G08G 1/048; G06F 17/60

[52] U.S. Cl. ............................ 705/13; 701/117; 701/119; 340/933

[58] Field of Search .................................... 701/117, 119; 705/13; 340/933

[56] References Cited

U.S. PATENT DOCUMENTS

| | | | |
|---|---|---|---|
| 5,289,183 | 2/1994 | Hassett et al. | 340/905 |
| 5,396,429 | 3/1995 | Hanchett | 701/117 |
| 5,566,072 | 10/1996 | Momose et al. | 701/117 |
| 5,696,502 | 12/1997 | Busch et al. | 340/905 |
| 5,778,332 | 7/1998 | Chang et al. | 701/117 |
| 5,861,820 | 1/1999 | Kerner et al. | 340/934 |
| 5,889,477 | 3/1999 | Fastenrath | 340/905 |
| 5,995,898 | 11/1999 | Tuttle | 701/102 |

FOREIGN PATENT DOCUMENTS

| | | |
|---|---|---|
| H02-039400 | 7/1988 | Japan . |
| 2-039400 | 2/1990 | Japan . |
| 5-035997 | 2/1993 | Japan . |
| H05-35997 | 2/1993 | Japan . |

OTHER PUBLICATIONS

Sumi et al., "Method of Measuring Travel Time Using Ultrasonic Vehicle Profile Classifiers," IEE Conf. Publ. No. 299, Second International Conference on Road Traffic Monitoring, pp. 29–32, 1989.

*Primary Examiner*—James P. Trammell
*Assistant Examiner*—Nicholas David Rosen
*Attorney, Agent, or Firm*—Robert E. Bushnell, Esq.

[57] ABSTRACT

A technique for showing running time by sections for a tollway includes: a unit toll collector installed at a unit toll gate of a tollway for calculating a running time of vehicles leaving the unit toll gate for each entrance toll gate; indicators installed at main points of the tollway for indicating running time by sections; and a traffic control center connected to the unit toll collector and a predetermined communication network for receiving the running time of vehicles for each entrance toll gate, averaging it to obtain the overall running time by sections, and outputting it to the indicators.

8 Claims, 5 Drawing Sheets

TECHNIQUE FOR SHOWING RUNNING TIME BY SECTIONS ON TOLLWAY

CLAIM OF PRIORITY

This application makes reference to, incorporates the same herein, and claims all benefits accruing 35 U.S.C.§ 119 from an application entitled SYSTEMAND METHOD OF SHOWING RUNNING TIME BY SECTIONS ON TOLLWAY earlier filed in the Korean Industrial Property Office on Aug. 20, 1997, and there duly assigned Serial No.97-39746 by that Office.

BACKGROUND OF THE INVENTION

1. Field of the Invention

The present invention relates to a technique for showing running time by sections on a tollway and more particularly, to a technique for showing running time by sections on a tollway in which running time by sections is reported on a tollway after the analysis of basic data on vehicles passing by lanes or unit times, the data being collected from a toll collector.

2. Detailed Description of the Related Art

Recently, toll collector systems for toll roads have been computerized in order to easily find error or unfairness in toll management, in addition to reducing the personnel required in collecting tolls, arranging data and reporting, as well as rapidly and conveniently dealing with those operations. The systems are classified roughly into two kinds: a closed system in which a toll is allotted according to the kind of vehicle and the travel distance from an entrance toll gate to an exit toll gate; and an open system of charging a predetermined toll according to the kind of vehicle passing through a point where a toll gate is installed.

In a unit business office (which may be installed at every toll gate) with the closed toll collector, there are provided an entrance controller for managing entrance-side lanes, and an exit controller for controlling exit-side lanes. These entrance/exit controllers are connected to a business office's controller. The business office's controller collectively manages toll-related operations after gathering information from the entrance/exit controllers.

Meanwhile, a roadway has a passing vehicle detector called a loop coil for every predetermined distance. A roadway traffic management system collects and analyzes data sent from the detector, to thereby determine the overall amount of traffic and display it on displays installed at main points on the road. The information allows drivers to know the traffic status on the road.

However, the existing roadway traffic guiding system indicates traffic status merely at three or four levels such as flowing, moderately crowded, and very heavy or stopped, on the basis of the number of passing vehicles per unit time detected by the passing vehicle detector. For this reason, drivers are not provided with substantial information such as the expected travel time by sections on the road.

SUMMARY OF THE INVENTION

Therefore, in order to overcome such drawbacks of the prior art, an objective of the present invention is to provide a technique for indicating running time by sections on a tollway, in which various kinds of basic data on traffic are provided by a toll collector at intervals of a predetermined unit time, and exact travel time by sections is calculated and indicated on basis of the data offered.

To accomplish the objective of the present invention, there is provided a system of showing running time by sections for a tollway comprising: a unit toll collector installed at a unit toll gate of a tollway for calculating a running time of vehicles leaving the entrance toll gates; indicators disposed at main points of the tollway for indicating running time by sections; and a traffic control center connected to the unit toll collector and a predetermined communication network for receiving the running time of vehicles at entrance toll gates, averaging it to obtain the overall running time by sections, and outputting it to the indicators.

For another aspect of the present invention, there is provided a method of showing running time by sections on a tollway comprising the steps of: receiving the average running time of vehicles leaving a unit toll gate from a unit toll collector installed at the unit toll gate at predetermined time intervals; classifying the average running time provided from the unit toll collector at entrance toll gates; calculating an average distribution from the average running time at entrance toll gates; calculating the overall average running time by averaging the running time while data deviating from a predetermined value is excluded from the average distribution obtained; and indicating the obtained average running time on indicators.

BRIEF DESCRIPTION OF THE ATTACHED DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Hereinafter, a preferred embodiment of the present invention will be described with reference to the attached drawings.

Figure 1:
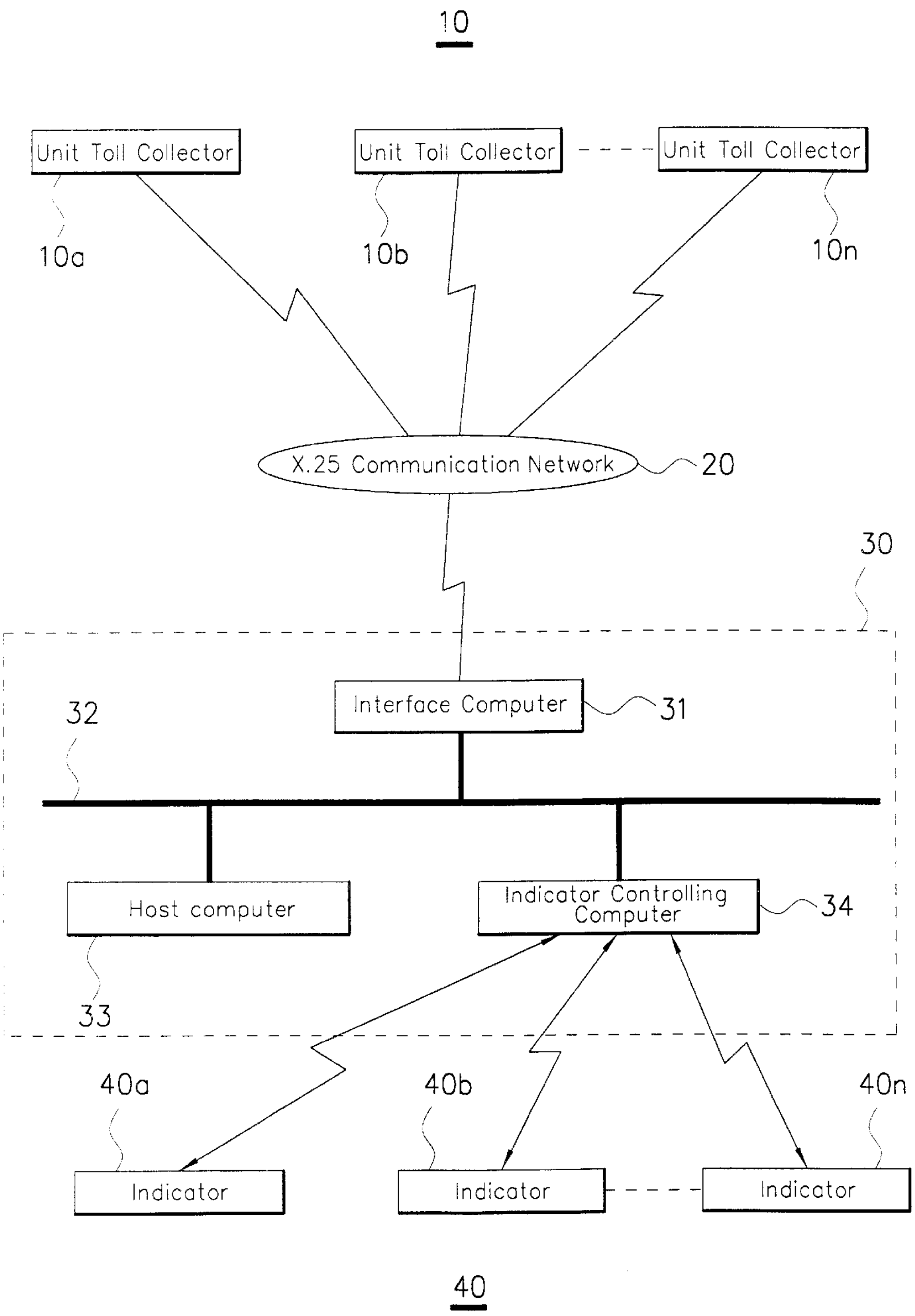
FIG. 1 is a block diagram of a running time by sections guiding system on a tollway according to an embodiment of the present invention.
Figure 3:
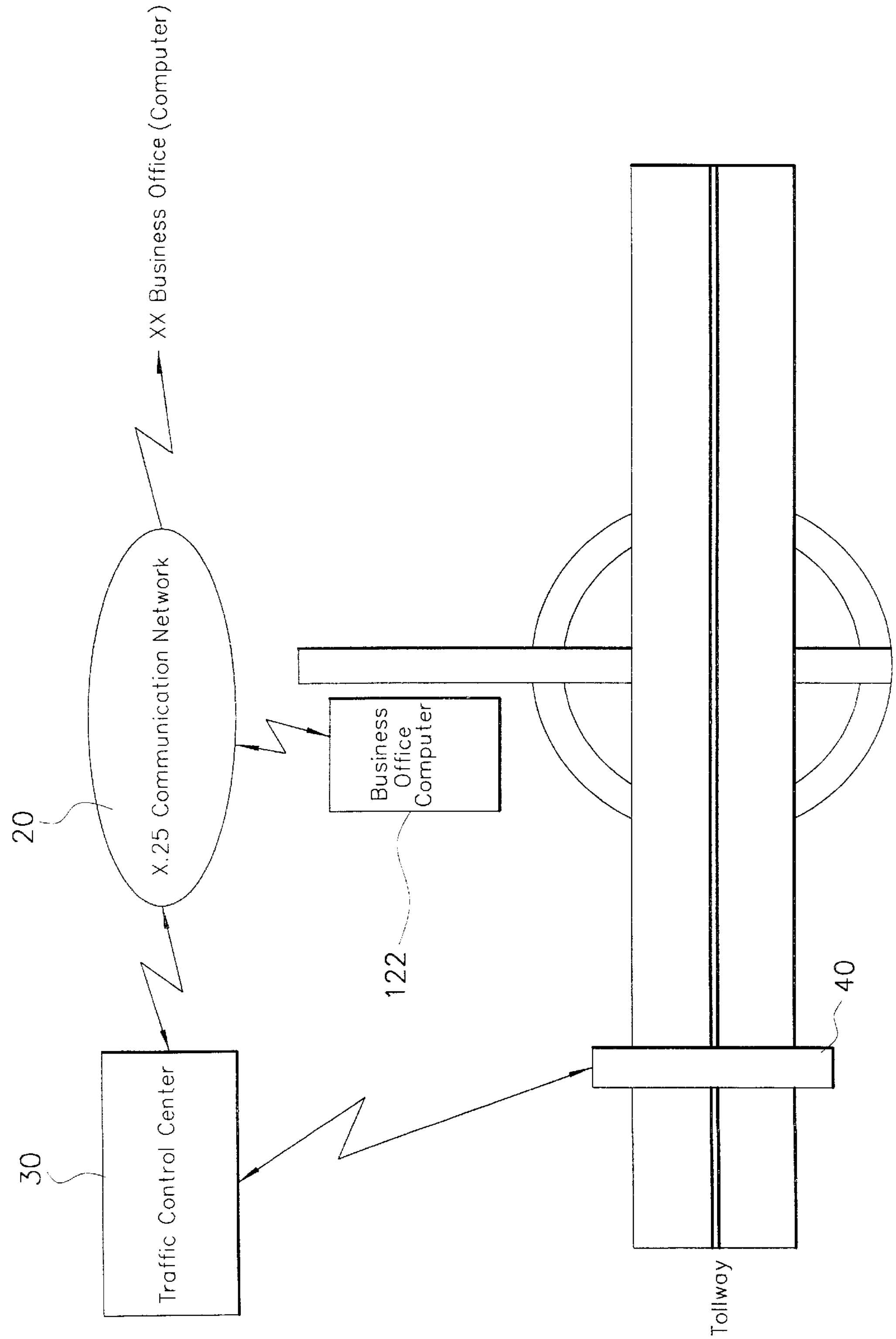
FIG. 3 is a diagram showing an installation status of the running time guiding system shown in FIG. 1.

Referring to FIGS. 1 and 3, a running time by sections reporting system of the present invention briefly comprises unit toll collectors 10, 10*a*, 10*b*, . . . , 10*n* installed at a toll gate (or at a set of toll gates, called a unit business office for convenience), a traffic control center 30 for collectively gathering and managing a road's traffic status, a communication network 20 for connecting the unit toll collectors 10, 10*a*, 10*b*, . . . , 10*n* to the traffic control center 30, and indicators 40, 40*a*, 40*b*, . . . , 40*n* for displaying by-sections running time analyzed by the traffic control center 30 installed at main points on a road at predetermined intervals of unit time.

In this configuration, for the communication network 20, an X.25 (recommendation number by International Telecommunication Union-Telecommunication sector, i.e., ITU-T) network is preferably employed, which is an interface communication network between data terminating equipment (DTE) and data circuit-terminating equipment (DCE) for terminals which are connected to a packet data network (PDN) through a dedicated line and run in a package type.

Figure 2:
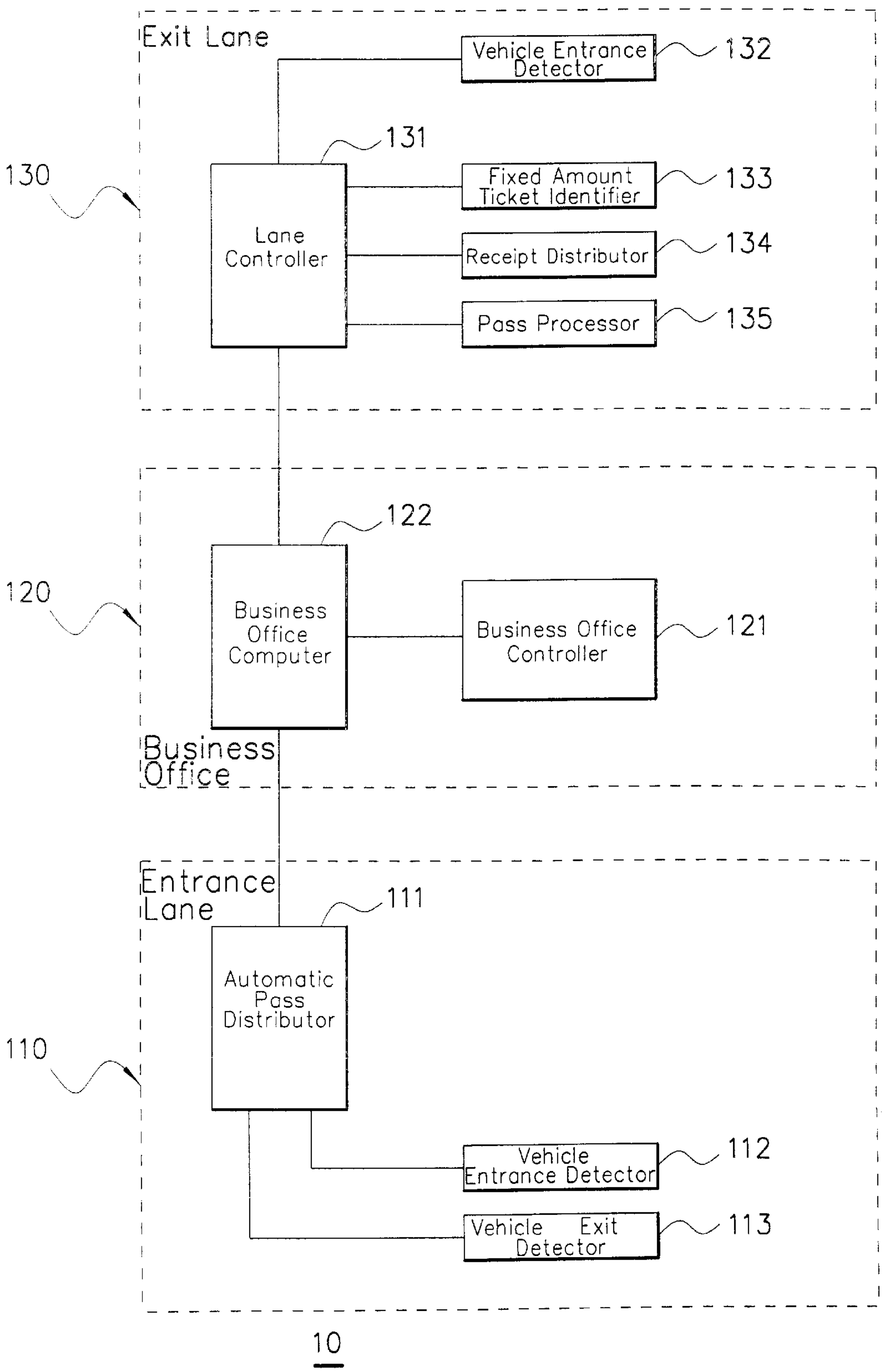
FIG. 2 is a detailed block diagram of a unit toll collector shown in FIG. 1 and installed at a toll gate.

A unit toll collector 10, as shown in FIG. 2, consists of an entrance-side controller 110, business office-side controller 120, and exit-side controller 130. The entrance-side controller 110 has a vehicle entrance detector 1 12 installed at each entrance-side lane for sensing a vehicle entering is the toll collector, an automatic pass distributor 111 for automatically issuing a pass to an incoming vehicle, where the incoming toll gate's identification code, passing time, the kind of vehicle, passing lane, and worker's code are magnetically recorded, a vehicle exit detector 113 for detecting the vehicle leaving the toll collector, and an entrance-side lane controller.

This lane controller may be integrally combined with automatic pass distributor 111. The information dealt with by the entrance-side lane controller includes an incoming toll gate's identification code, passing time, the kind of vehicle, passing lane, and worker's code. In case of an unmanned toll collector, a vehicle kind discriminator (not shown) is additionally installed in the configuration.

The business office-side controller 120 has a business office controller 121 for displaying the status of equipment and service of the respective lanes via a screen, and a business office computer 122 for managing the overall operation of toll collection by the business office.

Finally, the exit-side controller 130 consists of an exit-side lane controller 131 installed at each exit-side lane for controlling and managing the overall operation of toll collection at each of the lanes, a vehicle entrance detector 132 for detecting a vehicle entering its own lane, a fixed-amount ticket identifier 133 for dealing a fixed-amount ticket presented as toll, a pass processing device 135 for dealing the pass received from a driver, and a receipt distributor 134 for issuing a receipt for toll.

In this construction, the exit-side controller 130 reads data on the title of the incoming toll gate, passing time, and the kind of vehicle recorded on the magnetic band of the pass, and then applies data detected from the exit to the data read, to thereby calculate and indicate the toll.

After reception of the toll from the passenger, the exit-side controller controls receipt distributor 134, which in turn issues the receipt.

The traffic control center 30 which is connected to the unit toll collectors through the communication network 20 comprises an interface computer 31 for controlling the interface, a host computer 33 for gathering and analyzing various kinds of basic data offered through the interface computer 31 to thereby calculate running time by sections, and an indicator controlling computer 34 for receiving the by-sections running time data calculated by the host computer 33 to thereby control indicator 40. Those computers 31, 33, and 34 are connected to each other through a LAN 32.

The operation of the running time showing technique of the present invention will be explained below in detail.

First of all, the system comprises toll collectors 10*a*, . . . 10*n*, communication network 20, traffic control center 30, and indicator 40. In that construction, the business office computer 122 of a unit toll collector 10 calculates the average running time by sections, using basic data obtained during the toll collecting procedure, and then sends it to the interface computer 31 of the traffic control center 30 through the communication network 20. After that, the host computer 33 of the traffic control center 30 analyzes and stores average by-sections running time with respect to the overall tollway network, using the average by-sections running time sent from the business office computer 122, and informs tollway drivers of it through indicator 40.

Figure 4:
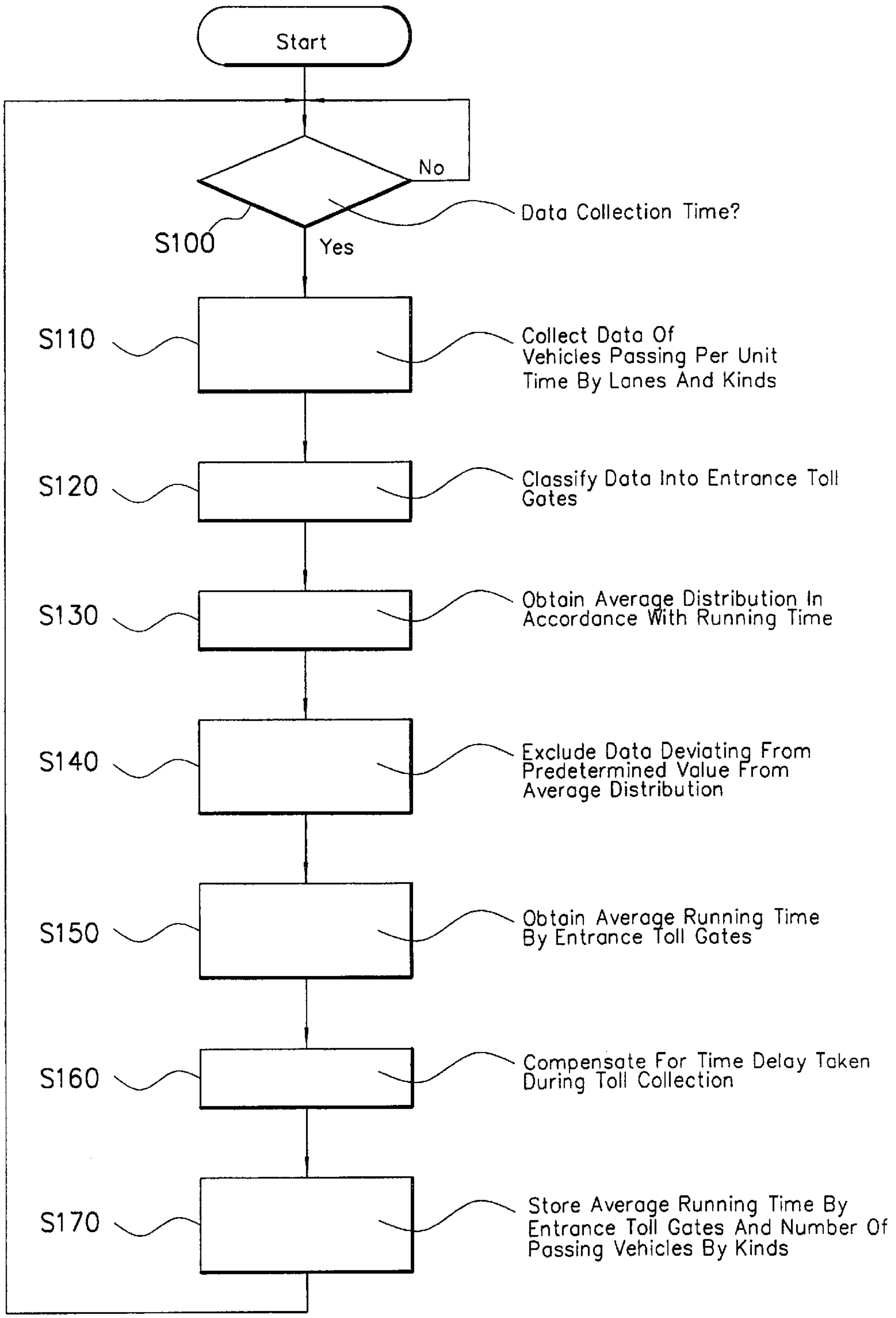
FIG. 4 is a flowchart representing a data collection procedure in a running time by sections guiding method according to the present invention.

Turning to FIG. 4, the data collection procedure of the unit toll collector is performed by the business office computer 122 as the main body. In this embodiment, the basic data is collected at predetermined time intervals, for instance, 15 minutes. In step S100, a determination is made as to whether or not the current time is the data collection time. If so, step S110 proceeds to collect various kinds of data for vehicles passing through the toll gate by lanes, workers, and kind of vehicles, for 15 minutes, the unit time. Then, in step S120, the data collected in step S110 is classified into entrance toll gates, and in step S150, the average running time of vehicles leaving the toll gates and the number of passing vehicles is calculated by the kinds of vehicles. The calculation result is stored in step S170.

However, while a vehicle passes through a tollway, it possibly stays for a long time at a rest stop. If the average running time is calculated including this vehicle, there is a difference between the obtained average running time and the overall running time. In consideration of it, in step S130 the average distribution in accordance with running time is calculated, and in step S140 data on a vehicle having a value deviating from a predetermined value in the average distribution is excluded. In step S150 only data on vehicles falling within the predetermined value in the average distribution is preferably used to obtain the average running time by the entrance toll gates. Besides, a long time may be taken during the issuance of a pass or the payment of a toll at the entrance/exit toll gate.

In step S160, the time delay related to toll collection is preferably subtracted from the calculated average running time.

Figure 5:
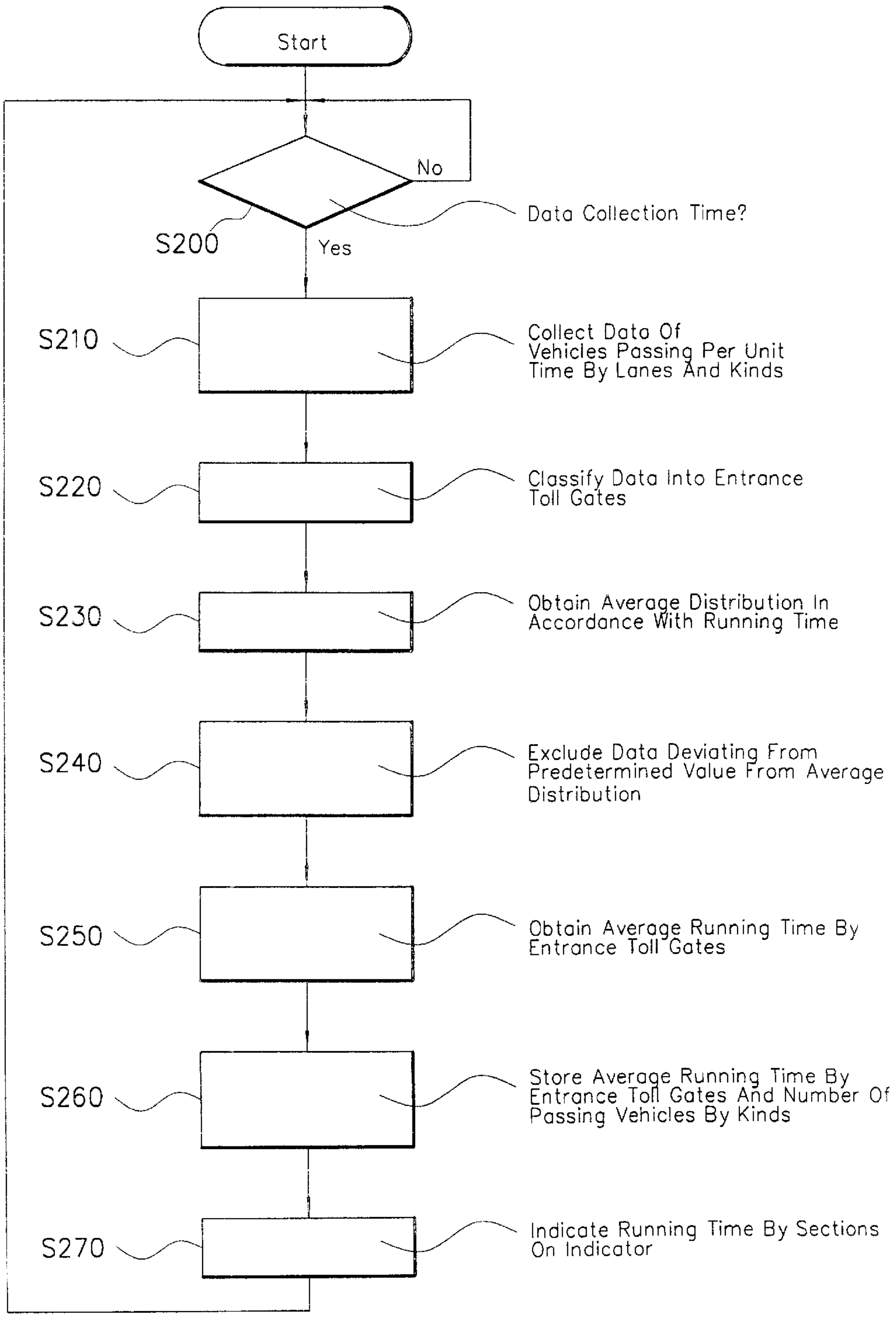
FIG. 5 is a flowchart showing a data analysis and information offer procedure in the running time by sections guiding method of the present invention.

Referring now to FIG. 5, the data analysis and information offer procedures are performed by the host computer 33 of the traffic control center 30. In step S200 a determination is made as to whether or not the current time is the data collection time. For instance, it is decided whether 15 minutes has passed from the point where the previous data collection ended. If so, step S210 advances to collect data related to the running time sent from the business office computer 122 of the unit toll collector 10, and in step S220 the data collected are classified into the entrance toll gates. In step S250 the average running time is calculated by the entrance toll gates on basis of the data. In step S260, the average running time by entrance toll gates and the number of passing vehicles by their kinds are stored. Finally, step S270 displays information on the running time by sections through indicator 40.

Similar to the collection procedure, step S230 calculates the average distribution in accordance with running time, and in step S240 a vehicle deviating from a predetermined value in the average distribution is preferably excluded from the data. In step S250 the average running time is preferably obtained on basis of the data remaining.

As described above, the technique for showing the running time by sections for a tollway of the present invention offers precise by-sections running time information of the tollway to tollway drivers, to thereby increase tollway use efficiency, and to facilitate detours in case of tollway congestion for the purpose of obtaining smoothly flowing traffic.

It will be apparent to the reader that the foregoing description of the invention has been presented for purposes of illustration and description and for providing an understanding of the invention and that many changes and modifications can be made without departing from the scope of the invention. It is therefore intended that the scope of the invention be indicated by the appended claims rather than by the foregoing description; and all changes which come within the meaning and range of equivalency of the claims are therefore intended to be embraced therein.

What is claimed is:

1. A method of showing running time by sections on a tollway, comprising the steps of:

receiving an average running time of vehicles leaving a unit toll gate from a unit toll collector installed at the unit toll gate at predetermined time intervals;

classifying the average running time provided from the unit toll collector for each entrance toll gate;

calculating an average distribution from the average running time;

calculating an overall average running time by averaging running time while data deviating from a predetermined value are excluded from the average distribution obtained; and indicating the overall average running time on an indicator.

2. The method as claimed in claim 1, further comprised of the calculating the overall average running time in the unit toll collector comprising the steps of:

collecting information of a vehicle passing an exit toll gate as to its incoming toll gate, the incoming toll gate passing time, and the exit toll gate passing time for a predetermined time;

classifying the collected information for each entrance toll gate;

obtaining an average distribution in accordance with running time from data from the classified collected information; and obtaining an average running time for each entrance toll gate on the basis of data remaining after excluding data deviating from the predetermined value from the average distribution obtained.

3. The method as claimed in claim 2, further comprising the step of compensating for time relate to toll collection in the average running time obtained for each entrance toll gate.

4. A system for showing running time by sections on a tollway, comprising:

a means for receiving an average running time of vehicles leaving a unit toll gate from a unit toll collector installed at the unit toll gate at predetermined time intervals;

a means for classifying the average running time provided from the unit toll collector for each entrance toll gate;

a means for calculating an average distribution from the average running time;

a means for calculating an overall average running time by averaging running time while data deviating from a predetermined value are excluded from the average distribution obtained; and a means for indicating the overall average running time on an indicator.

5. The system as claimed in claim 4, further comprised of the means for calculating the overall average running time in the unit toll collector comprising:

a means for collecting information of a vehicle passing an exit toll gate as to its incoming toll gate, the incoming toll gate passing time, and the exit toll gate passing time for a predetermined time;

a means for classifying the collected information for each entrance toll gate;

a means for obtaining an average distribution in accordance with running time from data from the classified collected information; and a means for obtaining an average running time for each entrance toll gate on the basis of data remaining after excluding data deviating from the predetermined value from the average distribution obtained.

6. The system as claimed in claim 5, further comprising a means for compensating for time related to toll collection in the average running time obtained for each entrance toll gate.

7. A method of collecting running time by sections on a tollway, comprising the steps of:

determining if a predetermined data collection time has been reached;

upon the predetermined data collection time having been reached, collecting data of vehicles passing per unit time by lanes and kinds;

classifying the collected data for each entrance toll gate;

obtaining an average distribution in accordance with running time;

excluding data deviating by a predetermined value from the average distribution;

obtaining an average running time for each entrance toll gate;

compensating for time delay taken during toll collection; and storing an average running time by entrance toll gate and number of passing vehicles by kinds.

8. A method of showing running time by sections on a tollway, comprising the steps of:

determining if a predetermined data collection time has been reached;

upon the predetermined data collection time having been reached, collecting data of vehicles passing per unit time by lanes and kinds;

classifying the collected data for each entrance toll gate;

obtaining an average distribution in accordance with running time;

excluding data deviating by a predetermined value from the average distribution;

obtaining an average running time for each entrance toll gate;

storing the average running time by entrance toll gate and number of passing vehicles by kinds; and indicating the average running time by sections on an indicator.

* * * * *